(12) United States Patent
Durand et al.

(10) Patent No.: US 10,011,388 B2
(45) Date of Patent: Jul. 3, 2018

(54) METHOD AND DEVICE FOR THE RIGID CONNECTION OF TWO THIN ELEMENTS

(71) Applicant: MBDA FRANCE, Paris (FR)

(72) Inventors: François Durand, Magny les Hameaux (FR); Xavier Bertrand, Montigny-le Bretonneux (FR); Javier Sistac-Meler, Plaisir (FR); Benoit Leclercq, Montigny-le Bretonneux (FR)

(73) Assignee: MBDA FRANCE, Paris (FR)

( * ) Notice: Subject to any disclaimer, the term of this patent is extended or adjusted under 35 U.S.C. 154(b) by 299 days.

(21) Appl. No.: 14/383,663

(22) PCT Filed: Mar. 18, 2013

(86) PCT No.: PCT/FR2013/000074
§ 371 (c)(1),
(2) Date: Sep. 8, 2014

(87) PCT Pub. No.: WO2013/140051
PCT Pub. Date: Sep. 26, 2013

(65) Prior Publication Data
US 2015/0034637 A1    Feb. 5, 2015

(30) Foreign Application Priority Data

Mar. 20, 2012    (FR) .................................... 12 00835

(51) Int. Cl.
*B65D 8/00*    (2006.01)
*B65D 6/34*    (2006.01)
(Continued)

(52) U.S. Cl.
CPC ............ *B65D 11/22* (2013.01); *F16B 5/0072* (2013.01); *B65D 90/08* (2013.01); *F16B 5/0664* (2013.01);
(Continued)

(58) Field of Classification Search
CPC .. F16B 5/121; F16B 5/128; F16B 5/12; F16B 5/0072; F16B 5/0664; F16B 5/0607;
(Continued)

(56) References Cited

U.S. PATENT DOCUMENTS

| 3,784,659 A * | 1/1974 | Lupert | ................... B29C 53/48 264/45.3 |
| 2005/0053446 A1* | 3/2005 | Huang | .................. F16B 5/0208 411/396 |
| 2011/0250034 A1* | 10/2011 | Swanson | ............... F16B 5/0692 411/103 |

FOREIGN PATENT DOCUMENTS

CH          597451 A5     4/1978
DE     102006023840 A1    11/2007

OTHER PUBLICATIONS

ISA/EP International Search Report dated Aug. 13, 2013 re PCT Application No. PCT/FR2013/000074, filed Mar. 18, 2013.

* cited by examiner

*Primary Examiner* — Anthony Stashick
*Assistant Examiner* — James M Van Buskirk
(74) *Attorney, Agent, or Firm* — Patrick J. Daugherty; Driggs, Hogg, Daugherty & Del Zoppo Co., LPA

(57) ABSTRACT

According to the present invention, the device comprises: a flange having an at least approximately trapezoidal tapered section; a counter-flange having a shape complementary to that of said flange (1); and clamping means for clamping said flange and said counter-flange one in the direction of the other, interposing the edges of said elements shaped at least partially in the shape of said counter-flange.

12 Claims, 2 Drawing Sheets

(51) Int. Cl.
  *F16B 5/00*   (2006.01)
  *B65D 90/08*  (2006.01)
  *F16B 5/06*   (2006.01)

(52) U.S. Cl.
  CPC .......... *Y10T 29/49826* (2015.01); *Y10T 29/53* (2015.01)

(58) Field of Classification Search
  CPC .......... F16B 5/02; F16B 5/0692; F16B 35/06; F16B 27/14; Y10T 24/45262; Y10T 29/49826; Y10T 29/53; Y10T 29/49948; Y10T 29/49982; Y10T 29/49966; Y10T 29/49963; Y10T 29/49964; Y10T 403/75; Y10T 403/7092; B65D 11/22; B65D 90/08; B23P 19/00; B23P 11/00; B29C 45/0005; B29C 65/561; B29C 66/7212
  USPC .......... 403/281, 290; 220/4.21; 29/428, 263; 411/60.2; 52/410; 16/2.1
  See application file for complete search history.

METHOD AND DEVICE FOR THE RIGID CONNECTION OF TWO THIN ELEMENTS

RELATED APPLICATION

This application is a national filing of PCT application Serial No. PCT/FR2013/000074, filed Mar. 18, 2013.

The present invention relates to a method and a device for the rigid connection, via the opposing edges thereof, of two thin elements which are, for example, planar or cylindrical.

Although not exclusively, the present invention is most particularly appropriate for use with thin elements, of which at least one is produced from a composite fibre/resin material.

In order to assemble in a rigid manner, via the edges thereof, thin elements of composite fibre/resin material, it is known to provide the edges with flanges by means of adhesive bonding or by means of machining. In the first instance, the adhesive constitutes a weak point of the assembly whilst, in the second instance, the machining brings about the sectioning of fibres of the composite material and therefore also local weakening of the assembly.

An object of the present invention is to overcome these disadvantages.

To this end, according to the invention, the method for the rigid connection, via the opposing edges thereof, of two thin elements, which are, for example, planar or cylindrical, is remarkable in that:

a flange is prepared which has a cavity having a flared cross-section which is at least approximately trapezoidal;

a counter-flange is prepared which has a protrusion which has a convergent cross-section which is at least approximately trapezoidal and which has a shape which complements that of the cavity of the flange;

the edges of the thin elements are at least partially formed to the shape of the protrusion of the counter-flange;

the flange and the counter-flange are moved closer to each other with the formed edges being interposed between the cavity of the flange and the protrusion of the counter-flange; and the flange and the counter-flange are clamped in the direction of each other so that they press between them the formed edges of the elements, the depth of the cavity of the flange and the thickness of the edges of the elements being selected so that, at the end of clamping of the flange and the counter-flange, there is a gap between the base of the cavity of the flange and the edges of the elements.

In this manner, owing to the present invention, it is possible to assemble together in a rigid manner two thin elements, simply by clamping the opposing edges thereof which have been previously formed, without any weakening adhesive bonding or machining operation. Furthermore, it is ensured that the clamping is optimal, without being limited by any abutment contact between the edges of the elements and the base of the cavity of the flange.

The present invention further relates to a device for the rigid connection, via the opposing edges thereof, of two thin elements which may be planar or cylindrical, which is remarkable in that it comprises:

a flange which has a cavity having a flared cross-section which is at least approximately trapezoidal;

a counter-flange which has a protrusion which has a convergent cross-section which is at least approximately trapezoidal and which has a shape which complements that of the cavity of the flange; and clamping means for clamping the flange and the counter-flange in the direction of each other so that they can press, between the cavity of the flange and the protrusion of the counter-flange, the edges of the elements which are at least partially formed to the shape of the protrusion of the counter-flange.

Preferably, the protrusion of the counter-flange comprises an abutment face at the side of the small base of the convergent, at least approximately trapezoidal cross-section. In this manner, at least one of the formed edges can abut the abutment face in order to strengthen the connection and to prevent any tilting of one of the elements relative to the other.

In an embodiment of the present invention, the counter-flange is an integral portion of the edge of one of the elements.

Advantageously, the clamping means are screws which are either supported on the counter-flange and screwed into the flange, or are supported on the flange and screwed into the counter-flange.

The screws may comprise heads which are accommodated in recesses which are formed in the counter-flange or the flange, respectively, and on which the heads are supported.

When the counter-flange is an integral portion of the edge of one of the elements, it may comprise a partial housing for the flange.

A particularly advantageous implementation of the present invention is the end-to-end assembly of two cylindrical portions of a container, the container portions being able to be produced from a composite fibre/resin material.

BRIEF DESCRIPTION OF THE DRAWINGS

The Figures of the appended drawings will provide a good understanding of how the invention can be produced. In these Figures, identical reference numerals refer to elements which are similar.

DETAILED DESCRIPTION OF THE INVENTION

Figure 1:
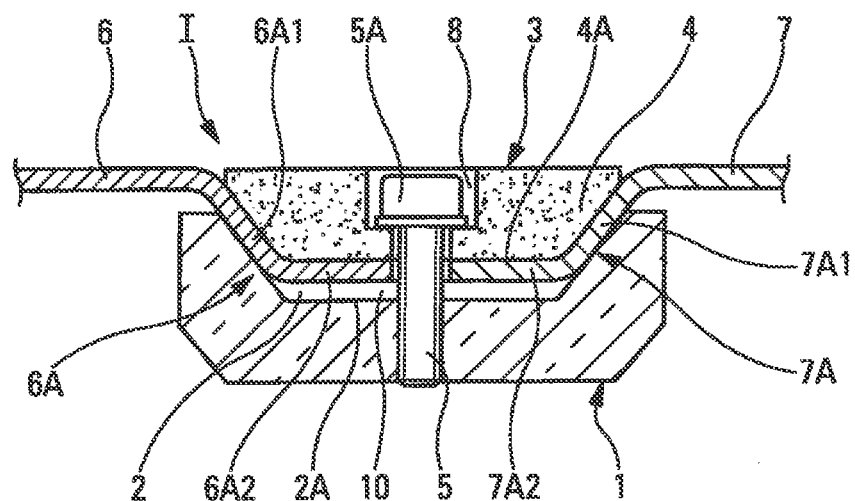
FIG. 1 is a cross-sectional view of an embodiment of the present invention.

FIGS. 1 to 4 are schematic cross-sections of four embodiments of the present invention, respectively.

Each of these four embodiments I to IV comprises:

a flange 1 which has a cavity 2 having a flared trapezoidal cross-section with a base 2A, a counter-flange 3 which has a protrusion 4 which has a convergent trapezoidal cross-section and which has a shape which complements that of the cavity 2 of the flange 1, the protrusion 4 having a small base 4A, and clamping means, for example, screws 5 for clamping the flange 1 and the counter-flange 3 in the direction of each other.

Furthermore, each of the four embodiments I to IV is intended to assemble in a rigid manner two thin elements 6 and 7 which are, for example, planar or cylindrical, via the opposing formed edges 6A and 7A thereof. In a specific embodiment of the invention, the elements 6 and 7 are cylindrical portions of a container which are produced, for example, from a composite fibre/resin material.

In the embodiments I, II and III, the head 5A of the screws 5 is accommodated in a recess 8 of the counter-flange 3 and the screws 5 are supported on the counter-flange 3 and are screwed into the flange 1. In the embodiment IV, however, the head 5A of the screws 5 is accommodated in a recess 9 of the flange 1 and the screws 5 are supported on the flange 1 and are screwed into the counter-flange 3.

The edges 6A and 7A of the embodiment I of FIG. 1 are formed in an identical manner, each of them comprising an oblique portion 6A1, 7A1 having the same shape as the oblique edges of the protrusion 4, and a portion 6A2, 7A2 corresponding to the base 4A of the protrusion 4. In this manner, when the opposing edges 6A and 7A are arranged between the flange 1 and the counter-flange 3, the oblique portions 6A1, 7A1 thereof may be in contact with the oblique portions of the flange 1 and the counter-flange 3, whilst the portions 6A2, 7A2 thereof may be in contact with the base 4A. After the screws 5 have been positioned and screwed, the edges 6A and 7A are assembled together in a rigid manner by means of clamping between the flange 1 and the counter-flange 3. So that this clamping can be optimal, the depth of the cavity of the flange 1 and the thickness of the edges 6 and 7 are such that, at the end of the clamping operation, there is a gap 10 between the base 2A of the cavity 2 of the flange 1 and the portions 6A2, 7A2 of the edges 6A and 7A. This situation of optimal clamping is what is illustrated in FIG. 1.

Figure 2:
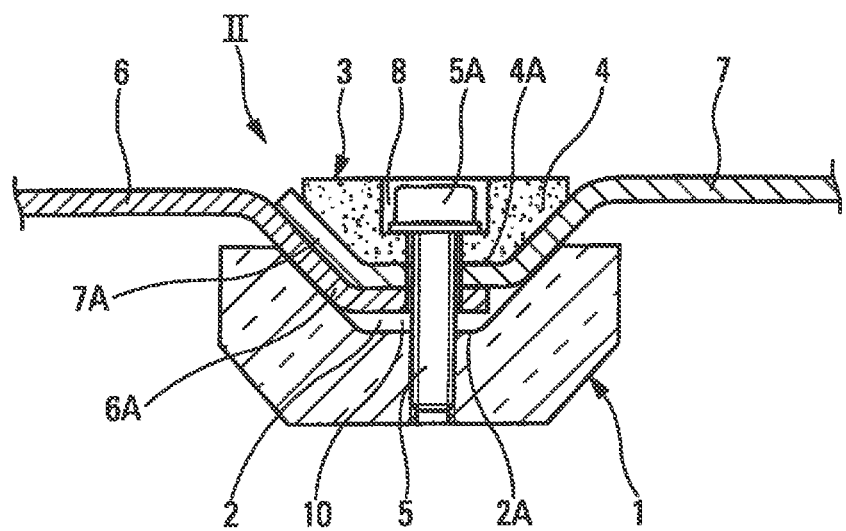
FIG. 2 is a cross-sectional view of another embodiment of the present invention.

In the production variant II of FIG. 2, the edge 7A of the element 7 is formed to correspond to the entire shape of the protrusion 4 of the counter-flange 3 and the edge 6A of the element 6 has a shape which is similar to that illustrated in FIG. 1, but it is applied to the edge 7A, instead of being applied directly to the counter-flange 3. In this instance again, at the end of clamping using the screws 5 (situation illustrated in FIG. 2), there is a gap 10 between the base 2A of the cavity 2 and the edges 6A.

Figure 3:
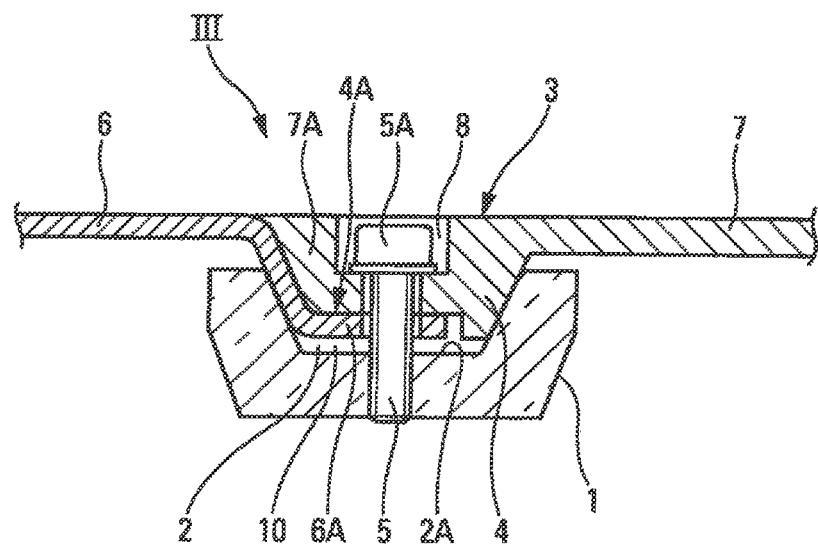
FIG. 3 is a cross-sectional view of another embodiment of the present invention.

The embodiment III of FIG. 3 is similar to the embodiment I of FIG. 1, with the exception that the counter-flange 3 is an integral portion of the edge 7A of the element 7. Consequently, in this embodiment, the base 4A is a part of the element 7 and only the edge 6A of the element 6 presses thereon.

Figure 4:
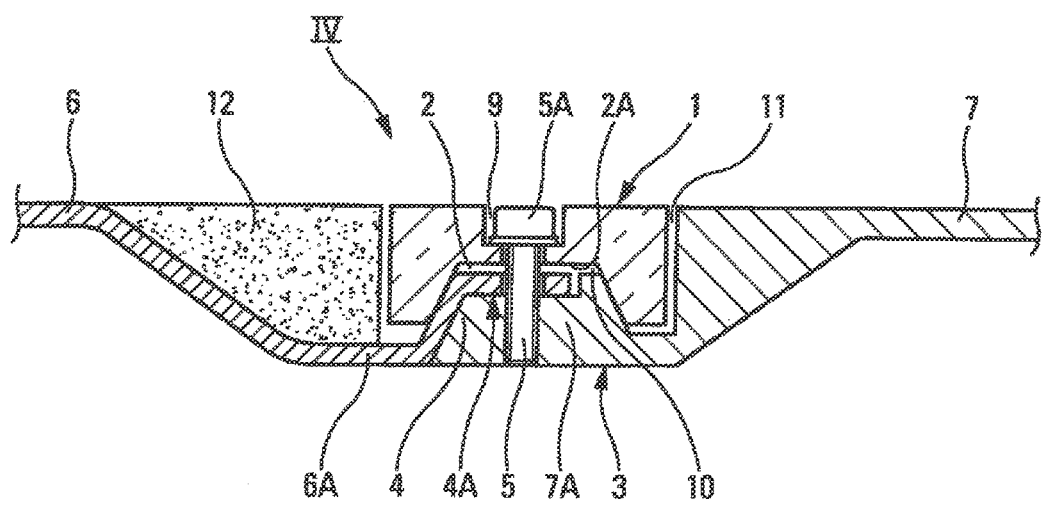
FIG. 4 is a cross-sectional view of another embodiment of the present invention.

In the same manner, in the embodiment IV of FIG. 4, the counter-flange 3 is an integral portion of the edge 7A of the element 7. Furthermore, the flange 1 is accommodated in a partial recess 11 of the edge 7A. This results in a thinning of the edge and the formation of a hollow portion at the side of the edge 6A of the element 6, which hollow portion can be closed by means of a filling 12.

Of course, although it has not been illustrated in the drawings, sealing joints (of any type) may be arranged, anywhere it is necessary, between the flange 5, the counter-flange 3, the screws 5 and the formed edges 6A and 7A.

The invention claimed is:

1. Method for rigid connection, via opposing edges thereof, of two thin elements, the method comprising:

clamping a flange and a counter-flange in a direction closer toward each other, thereby interposing formed edges of two thin elements of a composite fibre/resin material between a cavity of the flange and a protrusion of the counter-flange, wherein the flange cavity has a flared cross-section shape which is at least approximately trapezoidal and defined by a cavity base having a planar cross-section surface that is disposed between two oblique cavity portions that have planar cross-section surfaces that are each located at oblique angles with respect to the planar cross-section surface of the cavity base, the counter-flange protrusion has a cross-section shape which is at least approximately trapezoidal and is convergent with and complements the flange cavity flared cross-section shape and is defined by a protrusion base abutment face having a planar cross-section surface that is disposed between two oblique edges that have planar cross-section surfaces that are each located at oblique angles with respect to the planar cross-section surface of the protrusion base abutment face wherein the protrusion oblique edge surfaces are thereby aligned to be convergent with the flange oblique portion cross-section surfaces of the cavity and the protrusion base abutment face surface is thereby aligned to be convergent with the flange cavity base surface; and the clamping the flange and the counter-flange in the direction closer toward each other pressing between them the formed edges of the two thin elements, wherein the two thin elements are at least partially formed into a rigid connection having the shape of the protrusion of the counter-flange and each comprise a base portion that is disposed in alignment with and between the protrusion base abutment face surface and the flange cavity base surface, and at least one oblique portion that is disposed in alignment with and between convergent ones of the oblique edge surfaces and the flange cavity oblique portion surfaces; and wherein a depth of the cavity of the flange and a thickness of the formed edges of the two thin elements are selected so that, at the end of clamping of the flange and the counter-flange, there is a gap between the base surface of the cavity and the formed edges;

wherein at least one of the thin element base portions of the formed edges of the two thin elements abuts the protrusion base abutment face surface and thereby prevents tilting of one of the formed edges of the two thin elements relative to an other of the formed edges of the two thin elements;

wherein the two thin elements have a shape selected from the group consisting of a planar shape and a cylindrical shape; and wherein the formed edges of the two thin elements form the thin element base portions to have planar surfaces that are spaced from the flange cavity base surface by the spacing gap, said spacing gap enabling the clamping means to clamp the flange and the counter-flange in the direction toward each other without being limited by any abutment contact between the formed edges of the two thin elements and the flange cavity base surface.

2. The method of claim 1, wherein the two thin elements have the cylindrical shape and are two cylindrical portions of a container assembled end-to-end.

3. The method of claim 1, further comprising:

the clamping means pressing a first formed edge of the formed edges of the two thin elements to form, on either side of the thin element base portion of the first formed edge, two of the at least one thin element oblique portions that are each disposed in alignment with and between the convergent ones of the oblique edge surfaces and the flange cavity oblique portion surfaces, the first formed edge thereby corresponding to the at least approximately trapezoidal counter-flange protrusion; and the clamping means pressing a second formed edge of the formed edges of the two thin elements to form the thin element base portion and one of the at least one thin element oblique portions via engagement with the first formed edge.

4. A Device, comprising:
a flange which forms a cavity which is at least approximately trapezoidal and defined by a cavity base having a planar cross-section surface that is disposed between two oblique cavity portions that have planar cross-section surfaces that are each located at oblique angles with respect to the planar cross-section surface of the cavity base;
a counter-flange which has a protrusion which is at least approximately trapezoidal and is convergent with and complements the cavity of the flange and is defined by a protrusion base abutment face having a planar cross-section surface that is disposed between two oblique edges that have planar cross-section surfaces that are each located at oblique angles with respect to the planar cross-section surface of the protrusion base abutment face wherein the protrusion oblique edge surfaces are thereby aligned to be convergent with the flange oblique portion cross-section surfaces of the cavity and the protrusion base abutment face surface is thereby aligned to be convergent with the flange cavity base surface; and
clamping means for clamping the flange and the counter-flange in a direction toward each other so that they press, between the cavity of the flange and the protrusion of the counter-flange, formed edges of two thin elements of a composite fibre/resin material located between the cavity of the flange and the protrusion of the counter-flange, wherein the two thin elements are at least partially formed into a rigid connection that is at least approximately trapezoidal and each comprise a base portion that is disposed in alignment with and between the protrusion base abutment face surface and the flange cavity base surface, and at least one oblique portion that is disposed in alignment with and between convergent ones of the oblique edge surfaces and the flange cavity oblique portion surfaces;
wherein at least one of the thin element base portions abuts the protrusion base abutment face surface and thereby prevents tilting of one of the formed edges of the two thin elements relative to an other of the formed edges of the two thin elements;
wherein the two thin elements have a shape selected from the group consisting of a planar shape and a cylindrical shape; and
wherein the clamping means for clamping presses, between the cavity of the flange and the protrusion of the counter-flange, the formed edges of the two thin elements to form the thin element base portions to have planar surfaces that are spaced from the flange cavity base surface by a spacing gap, said spacing gap enabling the clamping means to clamp the flange and the counter-flange in the direction toward each other without being limited by any abutment contact between the formed edges of the two thin elements and the flange cavity base surface.

5. The Device according to claim 4, wherein the counter-flange is an integral portion of the edge of one of the two thin elements.

6. The Device according to claim 4, wherein the clamping means are screws which are supported on the counter-flange and screwed into the flange.

7. The Device according to claim 4, wherein the clamping means are screws which are supported on the flange and screwed into the counter-flange.

8. The Device according to claim 6, wherein the screws comprise heads which are accommodated in recesses formed on the flange by which they are supported.

9. The Device according to claim 5, wherein the counter-flange is an integral portion of the edge of one of the two thin elements and comprises a partial housing for the flange.

10. The Device of claim 4, further comprising:
A Container, comprising:
at least two cylindrical portions which are assembled end-to-end;
wherein the at least two cylindrical portions comprise the flange which has the cavity having a flared cross-section shape which is at least approximately trapezoidal, and the counter-flange which has the protrusion which has a convergent cross-section which is at least approximately trapezoidal and which has a shape which complements the shape of the cavity of the flange; and
wherein the at least two cylindrical portions are assembled end-to-end by clamping the flange and the counter-flange in a direction toward each other so that they press, between the cavity of the flange and the protrusion of the counter-flange, the formed edges of the two thin elements which are at least partially formed to the shape of the protrusion of the counter-flange.

11. The Device of claim 4, wherein the two thin elements have the cylindrical shape and are two cylindrical portions of a container that is assembled end-to-end by the Device.

12. The Device of claim 4, wherein a first formed edge of the formed edges of the two thin elements is pressed by the clamping means to form, on either side of the thin element base portion of the first formed edge, two of the at least one thin element oblique portions that are each disposed in alignment with and between the convergent ones of the oblique edge surfaces and the flange cavity oblique portion surfaces, the first formed edge thereby having a shape corresponding to the at least approximately trapezoidal cross-section shape of the counter-flange protrusion; and
wherein a second formed edge of the formed edges of the two thin elements is pressed by the clamping means to form the thin element base portion and one of the at least one thin element oblique portions via engagement with the first formed edge.

* * * * *